(12) United States Patent
Chambers et al.

(10) Patent No.: US 9,141,134 B2
(45) Date of Patent: Sep. 22, 2015

(54) UTILIZATION OF TEMPORAL AND SPATIAL PARAMETERS TO ENHANCE THE WRITING CAPABILITY OF AN ELECTRONIC DEVICE

(75) Inventors: Paul S. Chambers, San Jose, CA (US); Victor Weiping Liu, San Jose, CA (US); Brian Tarricone, Santa Clara, CA (US); Rhett Anderson, Bend, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/149,868

(22) Filed: May 31, 2011

(65) Prior Publication Data

US 2012/0200540 A1  Aug. 9, 2012

Related U.S. Application Data

(60) Provisional application No. 61/396,789, filed on Jun. 1, 2010.

(51) Int. Cl.
*G06F 3/0488* (2013.01)
*G06F 1/16* (2006.01)

(52) U.S. Cl.
CPC ............ *G06F 1/1616* (2013.01); *G06F 1/1643* (2013.01); *G06F 3/04883* (2013.01)

(58) Field of Classification Search
CPC .......................... G06F 1/1616; G06F 3/04883
USPC ........................................................ 345/179
See application file for complete search history.

(56) References Cited

U.S. PATENT DOCUMENTS

| 3,132,911 | A |   | 5/1964  | Heidler          |
|-----------|---|---|---------|------------------|
| 4,163,303 | A |   | 8/1979  | Hanna            |
| 4,619,304 | A |   | 10/1986 | Smith            |
| 4,633,436 | A | * | 12/1986 | Flurry ............ 345/179 |
| 4,821,373 | A |   | 4/1989  | Maidment et al.  |
| 5,355,555 | A |   | 10/1994 | Zarelius         |
| 5,461,581 | A |   | 10/1995 | Hallwirth et al. |
| 5,610,825 | A |   | 3/1997  | Johnson et al.   |
| 5,714,971 | A |   | 2/1998  | Shalit et al.    |
| 5,819,032 | A |   | 10/1998 | de Vries et al.  |
| 5,870,552 | A |   | 2/1999  | Dozier et al.    |
| 5,870,559 | A |   | 2/1999  | Leshem et al.    |
| 5,893,899 | A |   | 4/1999  | Johnson et al.   |
| 5,920,864 | A |   | 7/1999  | Zhao             |
| 5,958,008 | A |   | 9/1999  | Pogrebisky et al.|

(Continued)

OTHER PUBLICATIONS

Office Action mailed Jun. 6, 2014 for U.S. Appl. No. 12/964,660, 15 pages.

(Continued)

*Primary Examiner* — Kumar Patel
*Assistant Examiner* — Sejoon Ahn
(74) *Attorney, Agent, or Firm* — Schwabe, Williamson & Wyatt, P.C.

(57) ABSTRACT

The enhanced feature of this invention is the direction of a pen input on an electronic device to a separate canvas where it can be separately manipulated and processed for use. Temporal and spatial analysis can ensure that each canvas contain pen strokes that spatially belong together such as an individual word composed of multiple strokes for easy manipulation of the word on the screen. Another related enhanced feature of the invention for erasing portions of the inputted writing is the process of generating a new curve with different points than the original curve.

20 Claims, 3 Drawing Sheets

(56) References Cited

U.S. PATENT DOCUMENTS

| | | | |
|---|---|---|---|
| 5,987,704 A | 11/1999 | Tang | |
| 6,037,937 A | 3/2000 | Beaton et al. | |
| 6,094,197 A * | 7/2000 | Buxton et al. | 715/863 |
| 6,138,072 A | 10/2000 | Nagai | |
| 6,144,962 A | 11/2000 | Weinberg et al. | |
| 6,157,381 A | 12/2000 | Bates et al. | |
| 6,168,341 B1 | 1/2001 | Chene et al. | |
| 6,237,006 B1 | 5/2001 | Weinberg et al. | |
| 6,288,704 B1 | 9/2001 | Flack et al. | |
| 6,292,188 B1 | 9/2001 | Carlson et al. | |
| 6,333,994 B1 * | 12/2001 | Perrone et al. | 382/186 |
| 6,340,967 B1 * | 1/2002 | Maxted | 345/179 |
| 6,377,249 B1 * | 4/2002 | Mumford | 345/179 |
| 6,411,302 B1 | 6/2002 | Chiraz | |
| 6,466,220 B1 | 10/2002 | Cesana et al. | |
| 6,493,464 B1 * | 12/2002 | Hawkins et al. | 382/189 |
| 6,537,103 B2 | 3/2003 | Jamison | |
| 6,647,145 B1 * | 11/2003 | Gay | 382/187 |
| 6,697,524 B1 * | 2/2004 | Arai et al. | 382/187 |
| 7,032,187 B2 | 4/2006 | Keely et al. | |
| 7,100,119 B2 | 8/2006 | Keely et al. | |
| 7,158,678 B2 * | 1/2007 | Nagel et al. | 382/228 |
| 7,167,585 B2 * | 1/2007 | Gounares et al. | 382/187 |
| 7,168,035 B1 * | 1/2007 | Bell et al. | 715/234 |
| 7,251,413 B2 | 7/2007 | Dow et al. | |
| 7,425,103 B2 | 9/2008 | Perez-Sanchez | |
| 7,427,984 B2 * | 9/2008 | Smirnov et al. | 345/179 |
| 7,450,114 B2 | 11/2008 | Anwar | |
| 7,477,205 B1 | 1/2009 | de Waal et al. | |
| 7,480,858 B2 | 1/2009 | Chen et al. | |
| 7,551,312 B1 * | 6/2009 | Hull et al. | 358/1.18 |
| 7,564,995 B1 * | 7/2009 | Yaeger et al. | 382/119 |
| 7,567,239 B2 * | 7/2009 | Seni | 345/173 |
| 7,576,730 B2 | 8/2009 | Anwar | |
| 7,689,928 B1 | 3/2010 | Gilra | |
| 7,735,104 B2 | 6/2010 | Dow et al. | |
| 7,757,184 B2 | 7/2010 | Martin et al. | |
| 7,774,358 B2 | 8/2010 | Tamas et al. | |
| 7,873,243 B2 * | 1/2011 | Cohen et al. | 382/314 |
| 7,886,233 B2 | 2/2011 | Rainisto et al. | |
| 7,889,186 B2 * | 2/2011 | Nishimura et al. | 345/179 |
| 7,890,919 B1 * | 2/2011 | Williams | 717/100 |
| 8,140,560 B2 | 3/2012 | Dinn | |
| 8,155,498 B2 | 4/2012 | Dow et al. | |
| 8,200,796 B1 | 6/2012 | Margulis | |
| 8,340,476 B2 * | 12/2012 | Cohen et al. | 382/313 |
| 8,407,606 B1 | 3/2013 | Davidson et al. | |
| 8,510,677 B2 | 8/2013 | van Os | |
| 8,576,222 B2 * | 11/2013 | Handley et al. | 345/419 |
| 8,599,174 B2 * | 12/2013 | Cohen et al. | 345/179 |
| 8,610,672 B2 * | 12/2013 | Kun et al. | 345/173 |
| 8,749,480 B2 * | 6/2014 | Cohen et al. | 345/156 |
| 2001/0005207 A1 * | 6/2001 | Muikaichi et al. | 345/467 |
| 2002/0011990 A1 | 1/2002 | Anwar | |
| 2002/0024506 A1 | 2/2002 | Flack et al. | |
| 2002/0067319 A1 | 6/2002 | Hensel | |
| 2002/0080195 A1 | 6/2002 | Carlson et al. | |
| 2002/0097910 A1 * | 7/2002 | Guha | 382/187 |
| 2002/0109668 A1 | 8/2002 | Rosenberg et al. | |
| 2002/0113823 A1 | 8/2002 | Card et al. | |
| 2002/0133906 A1 | 9/2002 | Fedon | |
| 2003/0028851 A1 * | 2/2003 | Leung et al. | 715/541 |
| 2003/0030852 A1 | 2/2003 | Sampson et al. | |
| 2003/0202772 A1 | 10/2003 | Dow et al. | |
| 2003/0202773 A1 | 10/2003 | Dow et al. | |
| 2003/0214491 A1 * | 11/2003 | Keely et al. | 345/179 |
| 2004/0080498 A1 * | 4/2004 | Fujiwara et al. | 345/179 |
| 2004/0194014 A1 | 9/2004 | Anwar | |
| 2004/0196255 A1 * | 10/2004 | Cheng | 345/104 |
| 2004/0221311 A1 | 11/2004 | Dow et al. | |
| 2004/0257369 A1 | 12/2004 | Fang | |
| 2005/0010871 A1 | 1/2005 | Ruthfield et al. | |
| 2005/0051350 A1 | 3/2005 | Porter et al. | |
| 2005/0052427 A1 | 3/2005 | Wu et al. | |
| 2005/0078098 A1 * | 4/2005 | Dresevic et al. | 345/179 |
| 2005/0079477 A1 | 4/2005 | Diesel et al. | |
| 2005/0162413 A1 * | 7/2005 | Dresevic et al. | 345/179 |
| 2005/0183031 A1 | 8/2005 | Onslow | |
| 2006/0028457 A1 * | 2/2006 | Burns | 345/179 |
| 2006/0061551 A1 | 3/2006 | Fateh | |
| 2006/0152496 A1 | 7/2006 | Knaven | |
| 2006/0159345 A1 * | 7/2006 | Clary et al. | 382/186 |
| 2006/0184901 A1 | 8/2006 | Dietz | |
| 2006/0239505 A1 * | 10/2006 | Bjorklund et al. | 382/103 |
| 2006/0244738 A1 * | 11/2006 | Nishimura et al. | 345/179 |
| 2006/0253493 A1 | 11/2006 | Tamas et al. | |
| 2006/0256139 A1 | 11/2006 | Gikandi | |
| 2006/0274086 A1 | 12/2006 | Forstall et al. | |
| 2006/0277460 A1 | 12/2006 | Forstall et al. | |
| 2006/0284851 A1 | 12/2006 | Pittman | |
| 2006/0294466 A1 | 12/2006 | Muller et al. | |
| 2007/0061707 A1 | 3/2007 | Sally et al. | |
| 2007/0094267 A1 | 4/2007 | Good et al. | |
| 2007/0132763 A1 * | 6/2007 | Chu et al. | 345/442 |
| 2007/0180397 A1 * | 8/2007 | Hoyer et al. | 715/780 |
| 2007/0180471 A1 | 8/2007 | Unz | |
| 2007/0247445 A1 * | 10/2007 | Lynggaard et al. | 345/179 |
| 2007/0256031 A1 | 11/2007 | Martin et al. | |
| 2007/0291017 A1 * | 12/2007 | Syeda-Mahmood et al. | 345/179 |
| 2008/0076472 A1 | 3/2008 | Hyatt | |
| 2008/0078055 A1 | 4/2008 | Estlander | |
| 2008/0150946 A1 * | 6/2008 | Kuo | 345/442 |
| 2008/0165255 A1 | 7/2008 | Christie et al. | |
| 2008/0180409 A1 * | 7/2008 | Matsuda | 345/177 |
| 2008/0219556 A1 * | 9/2008 | Han et al. | 382/185 |
| 2008/0243808 A1 | 10/2008 | Reiman et al. | |
| 2008/0296074 A1 * | 12/2008 | Hollstron et al. | 178/19.01 |
| 2009/0015793 A1 | 1/2009 | Suzuki et al. | |
| 2009/0021493 A1 | 1/2009 | Marggraff et al. | 345/179 |
| 2009/0021494 A1 | 1/2009 | Marggraff et al. | 345/179 |
| 2009/0021495 A1 | 1/2009 | Edgecomb et al. | 345/179 |
| 2009/0044236 A1 | 2/2009 | Bendiabdallah et al. | |
| 2009/0052778 A1 * | 2/2009 | Edgecomb et al. | 382/188 |
| 2009/0063960 A1 | 3/2009 | Anwar | |
| 2009/0083618 A1 | 3/2009 | Campbell | |
| 2009/0083655 A1 | 3/2009 | Beharie et al. | |
| 2009/0100380 A1 | 4/2009 | Gardner et al. | |
| 2009/0119365 A1 * | 5/2009 | Tomic | 709/203 |
| 2009/0161958 A1 * | 6/2009 | Markiewicz et al. | 382/186 |
| 2009/0184972 A1 | 7/2009 | Weybrew et al. | |
| 2009/0198132 A1 | 8/2009 | Pelissier et al. | |
| 2009/0199123 A1 * | 8/2009 | Albertson et al. | 715/772 |
| 2009/0202112 A1 * | 8/2009 | Nielsen et al. | 382/113 |
| 2009/0204663 A1 | 8/2009 | Patwari | |
| 2009/0213085 A1 * | 8/2009 | Zhen et al. | 345/173 |
| 2009/0241054 A1 | 9/2009 | Hendricks | |
| 2009/0251441 A1 * | 10/2009 | Edgecomb et al. | 345/179 |
| 2009/0253107 A1 * | 10/2009 | Marggraff | 434/162 |
| 2009/0267923 A1 * | 10/2009 | Van Schaack et al. | 345/179 |
| 2009/0304281 A1 * | 12/2009 | Yipu | 382/187 |
| 2009/0324082 A1 * | 12/2009 | Liu et al. | 382/185 |
| 2010/0054845 A1 * | 3/2010 | Marggraff et al. | 401/195 |
| 2010/0077059 A1 | 3/2010 | Shen | |
| 2010/0077343 A1 | 3/2010 | Uhl et al. | |
| 2010/0097331 A1 | 4/2010 | Wu | |
| 2010/0104269 A1 | 4/2010 | Prestenback et al. | |
| 2010/0138875 A1 | 6/2010 | Johnson et al. | |
| 2010/0161653 A1 | 6/2010 | Krasnow | |
| 2010/0175018 A1 | 7/2010 | Petschnigg et al. | |
| 2010/0177047 A1 | 7/2010 | Brenneman et al. | |
| 2010/0185948 A1 | 7/2010 | Anwar | |
| 2010/0185975 A1 | 7/2010 | Anwar | |
| 2010/0192062 A1 | 7/2010 | Anwar | |
| 2010/0210332 A1 * | 8/2010 | Imai | 463/7 |
| 2010/0211866 A1 | 8/2010 | Nicholas et al. | |
| 2010/0245295 A1 * | 9/2010 | Kimpara | 345/179 |
| 2010/0259494 A1 | 10/2010 | Kii | |
| 2010/0278504 A1 | 11/2010 | Lyons et al. | |
| 2010/0281372 A1 | 11/2010 | Lyons et al. | |
| 2010/0281384 A1 | 11/2010 | Lyons et al. | |
| 2010/0289820 A1 * | 11/2010 | Hoyer et al. | 345/619 |
| 2010/0309131 A1 * | 12/2010 | Clary | 345/168 |
| 2010/0315266 A1 | 12/2010 | Gunawardana et al. | |
| 2011/0018821 A1 | 1/2011 | Kii | |

(56) References Cited

U.S. PATENT DOCUMENTS

| | | | |
|---|---|---|---|
| 2011/0066965 A1 | 3/2011 | Choi | |
| 2011/0090155 A1 | 4/2011 | Caskey et al. | |
| 2011/0122081 A1 | 5/2011 | Kushler | |
| 2011/0145724 A1 | 6/2011 | Tsai et al. | |
| 2011/0148892 A1 | 6/2011 | Shreiner et al. | |
| 2011/0167369 A1 | 7/2011 | van Os | |
| 2011/0185318 A1* | 7/2011 | Hinckley et al. | 715/863 |
| 2011/0191719 A1* | 8/2011 | Hinckley et al. | 715/835 |
| 2011/0199297 A1* | 8/2011 | Antonyuk et al. | 345/157 |
| 2011/0202856 A1* | 8/2011 | Handley et al. | 715/764 |
| 2011/0209058 A1 | 8/2011 | Hinckley et al. | |
| 2011/0261060 A1* | 10/2011 | Waibel et al. | 345/473 |
| 2011/0289444 A1 | 11/2011 | Winsky | |
| 2011/0292042 A1* | 12/2011 | Vaganov | 345/419 |
| 2011/0296344 A1 | 12/2011 | Habib et al. | |
| 2011/0320950 A1 | 12/2011 | Rajput et al. | |
| 2012/0023433 A1 | 1/2012 | Choi et al. | |
| 2012/0032886 A1 | 2/2012 | Ciesla et al. | |
| 2012/0036468 A1 | 2/2012 | Colley | |
| 2012/0090135 A1 | 4/2012 | Soh | |
| 2012/0144283 A1* | 6/2012 | Hill et al. | 715/211 |

OTHER PUBLICATIONS

Final Office Action mailed Oct. 17, 2014 for U.S. Appl. No. 12/964,660, 51 pages.
Office Action mailed Nov. 19, 2012 for U.S. Appl. No. 13/117,080, 22 pages.
Final Office Action mailed Mar. 5, 2013 for U.S. Appl. No. 13/117,080, 26 pages.
Office Action mailed Dec. 19, 2013 for U.S. Appl. No. 13/117,080, 23 pages.
Final Office Action mailed Apr. 2, 2014 for U.S. Appl. No. 13/117,080, 20 pages.
Office Action mailed Apr. 15, 2013 for U.S. Appl. No. 13/117,087, 11 pages.
Final Office Action mailed Aug. 2, 2013 for U.S. Appl. No. 13/117,087, 7 pages.
Office Action mailed Aug. 5, 2014 for U.S. Appl. No. 13/117,087, 10 pages.
Office Action mailed Dec. 28, 2012 for U.S. Appl. No. 13/149,887, 9 pages.
Final Office Action mailed May 22, 2013 for U.S. Appl. No. 13/149,887, 11 pages.
Song Ho Ahn, "OpenGL Frame Buffer Object (FBO)", 2008, http://wayback.archive.org/web/20080822025141/http://ww.songho.ca/opengl/gl_fbo.html.
Microsoft Word—Split Function, Mar. 23, 2014, 5 pages.
Final Office Action mailed Nov. 26, 2014 for U.S. Appl. No. 13/117,087, 9 pages.

* cited by examiner

UTILIZATION OF TEMPORAL AND SPATIAL PARAMETERS TO ENHANCE THE WRITING CAPABILITY OF AN ELECTRONIC DEVICE

CROSS REFERENCE TO RELATED APPLICATIONS

This application claims priority to U.S. Provisional Patent Application 61/396,789 filed Jun. 1, 2010, entitled "Electronic Device for Education", the contents of which are incorporated herein by reference.

FIELD OF THE INVENTION

The invention relates to generally to electronic devices. More particularly, the invention relates to methods and devices for manipulating ink strokes on touch sensitive screens of an electronic device.

BACKGROUND OF THE INVENTION

In numerous electronic touch sensitive devices, a pen or stylus can be used to input writing and display the writing on the screen. In some devices, the method of implementing this includes processing co-ordinate streams from the user's manipulation of a pen near or touching a sensing apparatus attached to a display, and directly drawing on the device's graphics surface lines or curves that approximate the pen's motion. Other devices convert the co-ordinates produced by the motion of a pen to letters or words and then display these letters and words as typewritten text. In other devices, the strokes are interpreted and categorized as simple geometric shapes, and some processing is done to 'clean up' those shapes (e.g. 'straightening' a line, recognizing and adjusting circles and ovals, adjusting lines with an appropriate spatial relationship to form a triangle, rectangle, square, etc.) and these predefined shapes are displayed. Numerous methods also exist to erase writing on the screen.

The need still exists, however, for a better way to capture, display and edit writing on the screen. Manipulation of writing on the display and in storage could be more streamlined and efficient.

SUMMARY OF THE INVENTION

The enhanced feature of this invention is the direction of a pen input to a separate canvas where it can be separately manipulated and processed for use. Temporal and spatial analysis can ensure that each canvas contain pen strokes that spatially belong together such as an individual word composed of multiple strokes for easy manipulation of the word on the screen. Another related enhanced feature of the invention for erasing portions of the inputted writing is the process of generating a new curve with different points than the original curve.

DETAILED DESCRIPTION OF THE INVENTION

The term canvas refers to a graphics surface. It is typically used as an object within a web page and can initially contain lines and curves when downloaded from the web server, or can be manipulated later locally using a scripting language built into the browser (most commonly JavaScript).

In the instant invention, input pen events on a touch screen or similar device that accepts pen inputs are directed to a canvas object. The object can then be passed to another software component for processing, and the software component then performs filtering, curve-fitting, and similar processing techniques to determine a path the pen is following. The software component then determines and updates the canvas object with lines or curves that approximate the path that the pen took.

The advantage of the invention derives from extending an existing type of object (canvas object) with integrated pen support. This hybrid approach differs from conventional means of supporting pen, where capturing, processing and drawing are all performed in the same software component.

Another novel feature of this device is the method of performing temporal and spatial analysis of the co-ordinate information to group related strokes together, as opposed to attempting to do higher-level analysis of the strokes to recognize handwriting or geometric figures. The benefit is that handwritten words or figures can be selected and manipulated (moved, copy/pasted) as a logical unit (e.g. a word, diagram) rather than individual strokes. A word like 'little' written cursively is typically three strokes, and without this 'superscript' grouping, selecting and moving the first long cursive stroke would not move the dot over the 'i', or the cross across the 'tt'. The benefits get progressively greater for printed and mixed printed/cursive handwriting.

Figure 1:
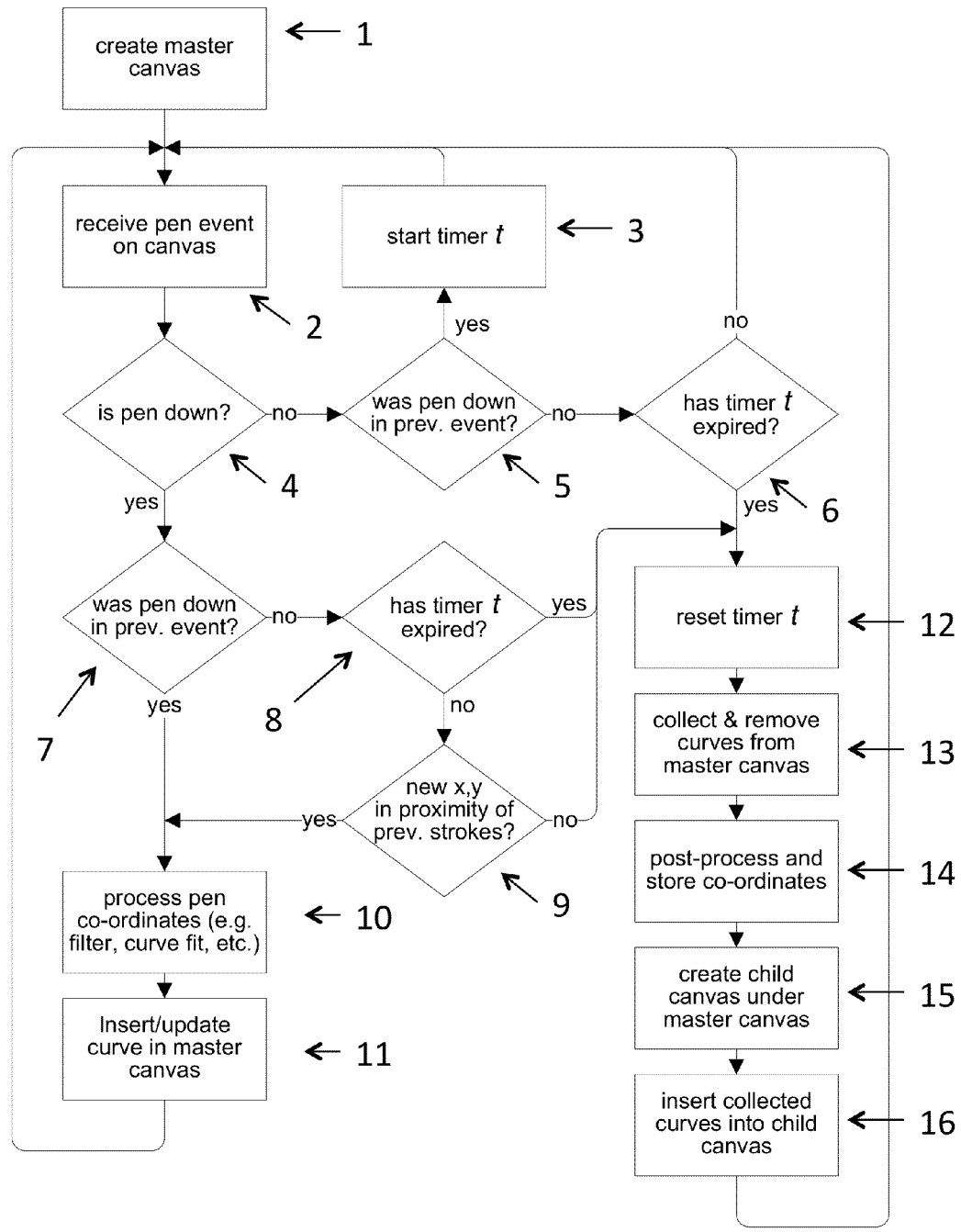
FIG. 1 shows a flowchart in accordance with the instant invention.

The flowchart shown in FIG. 1 illustrates how the super strokes are created and manipulated. The process begins with a master canvas that can accept input pen strokes. The first operation 2 is a read of the pen event. The first decision operation 4 is whether the pen input is being received (the pen is down or interacting with the screen). If the pen is down the next operation decision 7 is then whether the pen was down in the previous event. If the pen was down in the previous event, then operations 10 and 11 are executed and the pen coordinates are processed and inserted into the master canvas. The process then returns to operation 2.

If operation decision 4 was false and the pen is not down, the next operation decision 5 checks if the pen was down in the previous event. If it was, operation 3, starting a timer, is executed and the process returns to operation 2. If the pen was not down at operation decision 5, then operation decision 6 determines if the timer set in operation 3 has expired. If it has not expired, the process returns to operation 2. If it has expired then operations 12, 13, 14, 15 and 16 are executed before the process returns to operation 2. Operations 12, 13, 14, 15 and 16 reset the time and create a child canvas from the last set of curves from the master canvas.

If operation decision 4 was true but operation decision 7 was false, operation decision 8, checking whether the timer has expired, is executed. If at operation decision 8 the timer has expired, operations 12, 13, 14, 15 and 16 are executed and the process returns to operation 2.

If, on the other hand, at operation decision 8 it is determined that the timer has not expired, operation decision 9, determining if the new strokes are in close proximity to the previous ones, is executed. If they are, operations 10 and 11, processing the pen input and inserting or updating the curve in the master canvas, are executed and the process returns to operation 2. If at operation decision 8 it is determined that the timer has not expired and then at operation decision 9 it is determined that the new strokes are not in close proximity to the previous strokes then operations 12, 13, 14, 15 and 16 are executed and the process returns to operation 2.

In this way, child canvases are created that are based on temporal and spatial information. The child canvases make screen manipulation of the displayed input much easier and more efficient. For example, in this way, handwritten words or figures can be selected and manipulated (moved, copy/pasted) as a logical unit (e.g. a word, diagram) rather than individual strokes.

In many cases it is desired to edit the displayed canvasses in a similar way to using an eraser. This is typically done in one of two ways. There are several variants of systems that draw lines on the screen according to coordinates generated by a digitizer overlaying the display. In some cases, coordinates are filtered and curves are fitted to the coordinates. The 'vector' form of the data (i.e. the series of control points that determine the curve) is retained and portions of the curve can be manipulated by adjusting 'control points' or erased by cutting the curve at specific points. Alternatively, the curve can be converted to a bitmap and erasing can be done by pixel-level tools that affect the area of the pixels under the eraser area, irrespective of the means originally used to create the curve.

In the present invention, the improvement is to use an eraser tool on a curve or path wherein the area being erased is determined by a geometric shape (e.g. a circle) that tracks the pointing device (finger, stylus, pen etc.). The path is maintained in a vector format, not flattened to a bitmap. The area erased is determined by calculating the intersection(s) between the eraser shape and the path, inserting (or relocating) points at the intersections, and removing the line segments(s) and control points that fall within the eraser shape. A flowchart of this process is shown in FIG. 2 and FIG. 3.

Figure 2:
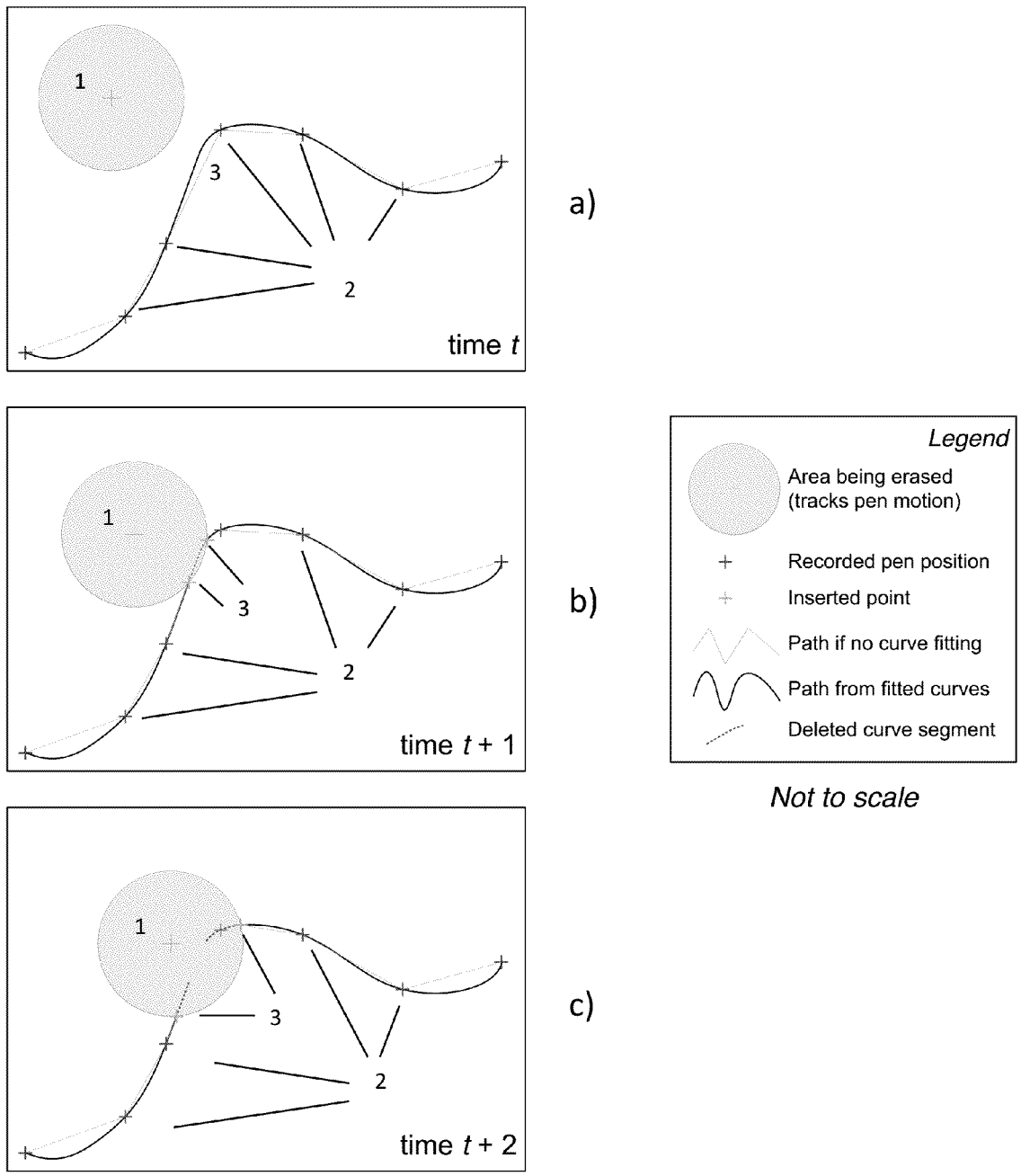
FIG. 2 shows an erasing process in accordance with the instant invention.
Figure 3:
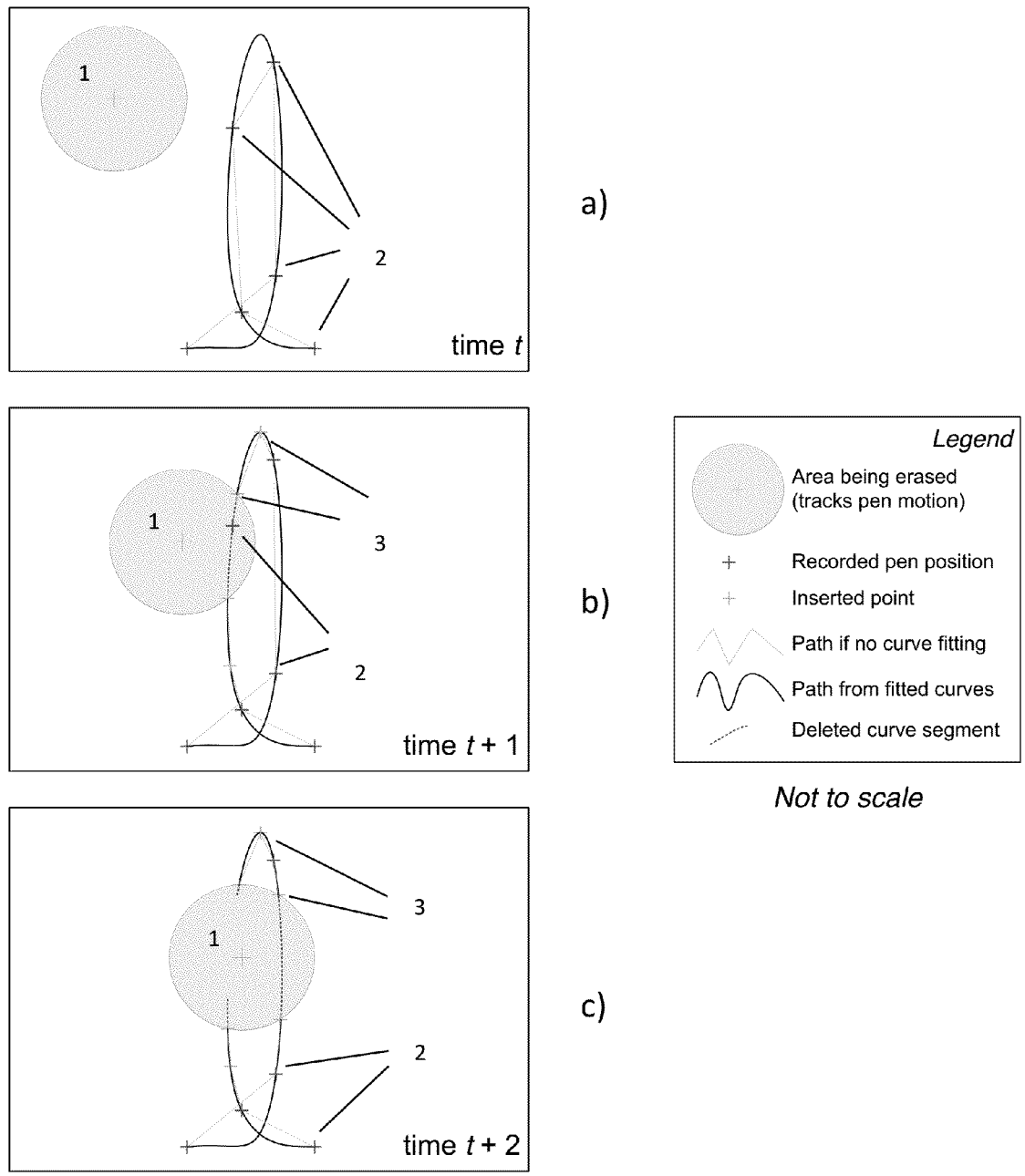
FIG. 3 shows an erasing process in accordance with the instant invention.

As can be seen in FIG. 2, and FIG. 3, the eraser tool (1) intersects a given curve with control points (2). As a result, the curve has some of its control points deleted and new points (3) inserted. In particular, in one embodiment, the eraser tool affects a curve that has been fitted to the recorded co-ordinates, not line segments connecting them. For example, the points used to fit a new curve do not necessarily coincide with the original recorded points or even lie on straight segment connecting the original recorded points. A segment of the curve is removed when the area covered by the eraser shape intersects it. New co-ordinates are added at the point of intersection of the eraser shape and the fitted curve, so that the curve is preserved. Inserting points at the intersection of the eraser shape and line segment(s) would alter the fitted curve, in some cases drastically. A curve-fitting algorithm treats endpoints specially. The eraser shape removing a segment of the curve will often create one or two new endpoints (depending on whether the curve was trimmed or bisected, respectively), the algorithm may choose to insert more than the new co-ordinate at the point of intersection. One or more points may be inserted or moved between the new co-ordinate at the point of intersection and nearest recorded co-ordinate, to preserve the original shape of the fitted curve in the absence of the original co-ordinates now erased. Since recorded co-ordinates represent 'original data', recorded co-ordinates are only ever deleted (i.e. if the eraser shape occludes them). Inserted points are marked as being synthetic, and the erasing algorithm may insert and move these freely as the erase shape moves and progressively clips larger amounts of the line segment.

What is claimed is:

1. An electronic device implemented method for receiving writing input, comprising:

receiving, via a first application operating on the electronic device, a pen input onto a master canvas of the first application;

creating, by the first application, a plurality of child canvases based on spatial and temporal information associated with the pen input, wherein each of the plurality of child canvases corresponds to one of a plurality of time periods defined by the temporal information, and the pen input made onto the master canvas during each time period of the plurality of time periods being inserted into a corresponding one of the plurality of child canvases after each time period of the plurality of time periods elapses, wherein the plurality of child canvases are separately processed by second one or more applications supporting the first application, and the plurality of child canvases enable individual manipulation of all the pen input made during the corresponding one of the plurality of time periods within the corresponding child canvas within the first application; and inserting, by the first application, the plurality of child canvases into the master canvas.

2. The method of claim 1, wherein the plurality of child canvases are smaller in area than a master canvas that receives the pen input.

3. The method of claim 2 wherein at least one of the plurality of child canvases encloses a single word.

4. The method of claim 1, further comprising:

receiving, by the electronic device, an eraser input that intersects a curve, wherein the curve is determined by a series of control points;

determining, by the electronic device, a shape of an erasing contour of the eraser input;

identifying, by the electronic device, based on the eraser input, one or more new control points that did not previously exist on the curve; and modifying, by the electronic device, the curve based on the erasing contour and the new control points.

5. The method of claim 4 wherein at least one of the new control points is between a point at which the eraser input intersects the curve and a nearest control point of the series of control points.

6. The method of claim 4, wherein the one or more new control points do not lie on a straight segment connecting two control points of the series of control points.

7. The method of claim 4, further comprising deleting, by the electronic device, one or more of the series of control points based on the eraser input.

8. The method of claim 4, wherein the one or more new control points are marked as being synthetic, and wherein the one or more new control points move in response to receiving additional eraser input.

9. The method of claim 1, wherein the spatial information is based on a proximity of pen strokes received as the pen input.

10. The method of claim 1, wherein the temporal information is based on the elapsing of a period of time between pen strokes received as the pen input.

11. A non-transitory computer readable medium having a plurality of instructions stored thereon, which, when executed by a processor of a computing device cause the computing device to:

receive, via a first application of the computing device, a pen input on a master canvas of the first application;

create, via the first application, a plurality of child canvases based on spatial and temporal information associated with the pen input, wherein each of the plurality of child canvases corresponds to one of a plurality of time periods defined by the temporal information, and the pen input made onto the master canvas during each time period of the plurality of time periods being inserted into a corresponding one of the plurality of child canvases after each time period of the plurality of time periods elapses, wherein the plurality of child canvases are separately processed by second one or more applications that support the first application, and the plurality of child canvases enable individual manipulation of all the pen input made during the corresponding one of the plurality of time periods within the corresponding child canvases within the first application; and insert, by the first application, the plurality of child canvases into the master canvas.

12. The non-transitory computer readable medium of claim 11, wherein the computing device is further caused to:

receive an eraser input that intersects a curve, wherein the curve is determined by a series of control points;

determine a shape of an erasing contour associated with the eraser input;

identify, based on the eraser input, one or more new control points that did not previously exist on the curve; and modify the curve based on the erasing contour and the new control points.

13. The non-transitory computer readable medium of claim 12, wherein at least one of the new control points is between a point at which the eraser input intersects the curve and a nearest control point of the series of control points.

14. The computer-readable medium of claim 12, wherein the one or more new control points do not lie on a straight segment connecting two control points of the series of control points.

15. The computer-readable medium of claim 12, wherein the instructions, when executed by the processor, further cause the computing device to delete one or more of the series of control points based on the eraser input.

16. The computer-readable medium of claim 12, wherein the instructions, when executed by the processor, further cause the computing device to:

mark the one or more new control points as being synthetic; and move the one or more new control points in response to receiving additional eraser input.

17. The non-transitory computer readable medium of claim 11 wherein the plurality of child canvases are smaller in area than the master canvas that receives the pen input.

18. The non-transitory computer readable medium of claim 17 wherein at least one of the plurality of child canvases encloses a single word.

19. The computer-readable medium of claim 11, wherein the spatial information is based on a proximity of pen strokes received as the pen input.

20. The computer-readable medium of claim 11, wherein the temporal information is based on the elapsing of a period of time between pen strokes received as the pen input.

\* \* \* \* \*